United States Patent [19]
Deol et al.

[11] Patent Number: 5,661,368
[45] Date of Patent: Aug. 26, 1997

[54] DUAL-VOLTAGE CONTROL FOR AN ELECTRICAL LOAD

[75] Inventors: Satvir Singh Deol, Belleville; Ahmad Mustapha Nasser, Dearborn; Thomas Alexander Bush, Northville, all of Mich.

[73] Assignee: Ford Motor Company, Dearborn, Mich.

[21] Appl. No.: 533,569

[22] Filed: Sep. 25, 1995

[51] Int. Cl.[6] .................................................. B60Q 1/02
[52] U.S. Cl. ......................... 315/82; 315/137; 307/10.8
[58] Field of Search ......................... 315/82, 137, 147; 307/10.8

[56] References Cited

U.S. PATENT DOCUMENTS

| | | | |
|---|---|---|---|
| 3,706,005 | 12/1972 | Carlson | 315/82 |
| 4,667,282 | 5/1987 | Peterson | 363/89 |
| 4,816,736 | 3/1989 | Dougherty et al. | 320/17 |
| 4,924,371 | 5/1990 | Peterson | 363/89 |
| 5,168,207 | 12/1992 | Follmer | 322/7 |

FOREIGN PATENT DOCUMENTS 2174559  11/1986  United Kingdom ............. 315/82

*Primary Examiner*—Benny Lee
*Assistant Examiner*—Michael Shingleton
*Attorney, Agent, or Firm*—Mark S. Sparschu

[57] ABSTRACT

In one embodiment of the present invention, a daytime running lamp (DRL) system for a motor vehicle includes a switchable connection from the headlamps of the vehicle to the neutral connection of the vehicle's alternator. Compared with the full system voltage of the vehicle, the neutral connection of the alternator is a lower-voltage source which can drive the headlamps at reduced brightness. Such reduced brightness is a typical characteristic of DRL systems. The system disclosed herein can be more cost-effective and provide greater energy efficiency than alternative DRL systems.

4 Claims, 1 Drawing Sheet

DUAL-VOLTAGE CONTROL FOR AN ELECTRICAL LOAD

BACKGROUND OF THE INVENTION

1. Field of the Invention

The present invention relates to electrical systems having dual-voltage control for an electrical load.

2. Description of the Related Art

A feature which is increasingly provided on motor vehicles is daytime running lamps (DRL). In a vehicle with DRL, the headlamps of the vehicle are normally illuminated when the vehicle's engine is running. This illumination is generally with reduced brightness with respect to the full brightness of the headlamps.

In a DRL system, manually turning on the vehicle's headlamps will override the DRL system and provide full-brightness illumination of the headlamps. Further, a manual override function is frequently provided such that the vehicle can be idled without the DRL system turning on the headlamps. This manual override function is sometimes provided by the driver of the vehicle setting the vehicle's parking brake.

A challenge in the design of DRL systems is providing the reduced illumination intensity of the headlamps. A number of ways to do this have been proposed. In one, a dropping resistor is selectively inserted into the headlamp feed circuit when DRL illuminates the headlamps. This dropping resistor provides the reduced-brightness illumination of the headlamps which is characteristic of DRL systems. In another DRL configuration, an electronic module pulse-width-modulates power supplied for illumination of the headlamps. When the headlamps are illuminated in DRL mode, the module provides a voltage of reduced duty cycle. The headlamps thus are illuminated with reduced brightness. In yet another DRL configuration, the headlamps are switchably connected in series when illuminated in DRL mode. This series connection, as opposed to the normal parallel connection of the headlamps, provides reduced illumination intensity of the headlamps.

Each of the proposed designs detailed above, although effective in providing a DRL function, has shortcomings. The dropping resistor design can waste a substantial amount of electrical energy. Further, the pulse-width-modulation design and the headlamps-in-series design are expensive designs, each having an electronic module for controlling the DRL function.

Therefore, a daytime running lamp system which is cost-effective and relatively energy-efficient will provide advantages over the prior art.

SUMMARY OF THE INVENTION

The present invention provides an electrical system comprising a polyphase alternator having a neutral connection and having an output with an average voltage greater than an average voltage at the neutral connection. The system further includes an electrical load and first switching means for switchably coupling and decoupling the electrical load to the output of the alternator. Additionally, the system comprises second switching means responsive to the first switching means for coupling the neutral connection of the alternator to the electrical load if the output of the alternator is decoupled from the electrical load by the first switching means.

The present invention also provides a method for controlling an electrical system having an electrical load adapted to be coupled and decoupled from a first voltage. The method comprises coupling the electrical load to a neutral connection of a polyphase alternator in response to the electrical load being decoupled from the first voltage.

The present invention also provides a second electrical system. The system comprises a polyphase alternator having a neutral connection and an output having an average voltage greater than an average voltage at the neutral connection. The system also includes at least one headlamp. Further, the system comprises a headlamp switch connected between the output of the alternator and the headlamp and adapted to switchably couple and decouple the output of the alternator to and from the at least one headlamp. In addition, the system contains a first relay having a contact responsive to the headlamp switch such that the contact couples the neutral connection of the alternator to the headlamp when the headlamp switch decouples the output of the alternator from the headlamp.

Daytime running lamp systems provided in accordance with the present invention can be more energy efficient and cost effective than alternative daytime running lamp systems. Thus, the present invention can provide advantages over the prior art.

DETAILED DESCRIPTION OF THE PREFERRED EMBODIMENT

Figure 1:
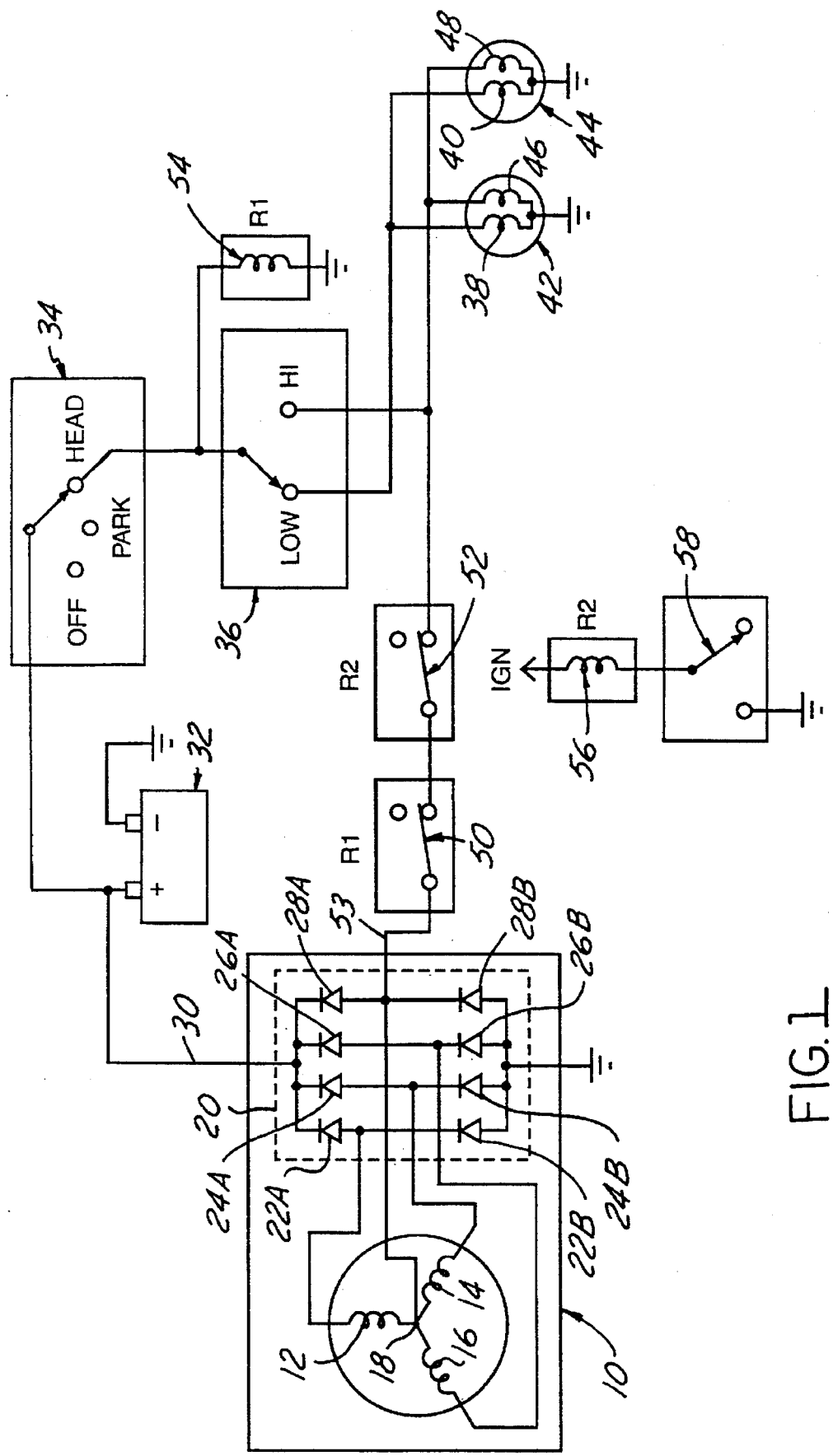
FIG. 1 is an electrical schematic of a portion of an automotive electrical system according to one embodiment of the present invention.

Referring to FIG. 1, a portion of an automotive electrical system according to one embodiment of the present invention will be described. The system includes an alternator 10. Alternator 10 includes three-phase stator windings 12, 14 and 16, which generate three-phase alternating current (AC) power. Stator windings 12, 14 and 16 are coupled together at a neutral connection 18.

Alternator 10 also includes rectifier 20. Rectifier 20 includes four pairs of diodes (22A and 22B, 24A and 24B, 26A and 26B, and 28A and 28B). Stator winding 12 is coupled between diodes 22A and 22B, stator winding 14 is coupled between diodes 24A and 24B, and stator winding 16 is coupled between diodes 26A and 26B. These connections provide rectification of the three-phase power generated in stator windings 12, 14 and 16 such that at output 30, direct-current (DC) power is provided.

Diodes 28A and 28B form a fourth pair of diodes which is only present in some prior-art alternator rectifiers. Neutral connection 18 is coupled between these diodes 28A and 28B. This fourth pair of diodes rectifies a third-harmonic voltage component which is present at neutral connection 18, providing increased power output from alternator 10. This increased power output comes at the cost of providing diodes 28A and 28B.

Among the electrical loads coupled to output 30 of alternator 10 is battery 32, which is charged by current provided by alternator 10.

Coupled to output 30 of alternator 10 is headlamp switch 34. As can be seen, headlamp switch 34 has three positions. In the OFF position, headlamps and parking lamps of the vehicle are off. In the PARK position, only parking lamps are on. (The connection from the PARK position of headlamp switch 34 to the parking lamps is conventional and will therefore not be shown here for clarity of presentation.)

In the HEAD position of headlamp switch 34, the headlamps of the vehicle are powered. (Typically, the parking lamps are powered as well.) When headlamp switch 34 is in the HEAD position, headlamp switch 34 provides power to high/low beam selector switch 36.

When high/low beam selector switch 36 is in the LO position, high/low beam selector switch 36 provides power to low beam filaments 38 and 40 of headlamps 42 and 44. When high/low beam selector switch 36 is in the HI position, high/low beam selector switch 36 provides power to high beam filaments 46 and 48 of headlamps 42 and 44.

High beam filaments 46 and 48 are coupled to neutral connection 18 of alternator 10 via normally closed contacts 50 and 52 of relays R1 and R2, respectively. It should be noted that the neutral connection of an alternator is not generally provided for external connection. An output 53 of alternator 10, to which neutral connection 18 is coupled, would need to be added should a particular alternator not already have external access to neutral connection 18.

The coil 54 of relay R1 is coupled such that coil 54 is energized (opening contact 50 of relay R1) if headlamp switch 34 is in the HEAD position.

Coil 56 of relay R2 is coupled such that when the parking brake of the vehicle is applied, as sensed by the closing of parking brake switch 58, coil 56 is energized. This opens contact 52 of relay R2.

The system illustrated in FIG. 1 provides a cost-effective daytime running lamp (DRL) feature, whose function is as follows. When headlamp switch 34 is not in the HEAD position, indicating that the driver of the vehicle is not affirmatively selecting his headlamps to be on, coil 54 of relay R1 is not energized. Thus, normally closed contact 50 is closed. Further, if the parking brake of the vehicle is not applied, parking brake switch 58 will be open. Coil 56 of relay R2 will thus not be energized, leaving contact 52 of relay R2 closed. Thus, high beam filaments 46 and 48 of headlamps 42 and 44 will be coupled to neutral connection 18 of alternator 10.

It has been demonstrated in a particular alternator 10 tested by the inventors that when alternator 10 is operating, neutral connection 18 has a AC voltage with an average value of about 6.7 volts. This is in contrast to the typical DC voltage at output 30 of alternator 10, which is around 14 volts. Thus, by connecting high-beam filaments 46 and 48 to neutral connection 18, those filaments will operate at reduced brightness when compared to connection of these filaments to output 30 of alternator 10. This reduced brightness provides a DRL feature.

The reduced brightness DRL feature is active at all times when the engine of the vehicle is running, except when headlamp switch 34 is in HEAD position or when the parking brake switch 58 is closed. Either of these events will open a normally closed contact 50 or 52, decoupling high beam filaments 46 and 48 from neutral connection 18. Headlamp switch 34 being in the HEAD position indicates that the driver wishes full-function headlamps. The overriding feature provided when parking brake switch 58 is closed provides the driver a method to override his daytime running lights feature if he wishes to idle his vehicle without his headlamps on.

Headlamp switch 34 is a "high-current" switch. That is, headlamp switch 34 carries the current from output 30 of alternator 10 to headlamps 42 and 44. However, other known headlamp control systems employ a "low-current" headlamp switch which is an input to an electronic controller. The electronic controller has a high-current output to drive the headlamps (that is, to couple the headlamps to output 30 of alternator 10). In such a system, relay coil 54 of relay R1 can be coupled in either the "low-current" portion of the system (that is, coupled to the headlamp switch) or coupled in the "high-current" portion of the system (that is, coupled at the output side of the electronic controller).

It should be noted that while relays R1 and R2 are described herein as electromechanical relays, those skilled in the art recognize that solid-state relays can be employed in place of either of relays R1 and R2. Such solid-state relays typically include field-effect transistors (FETs) or other semiconductor devices.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical system comprising:

a polyphase alternator having a neutral connection and having an output with an average voltage greater than an average voltage at said neutral connection;

an electrical load;

first switching means for switchably coupling and decoupling said electrical load to said output of said alternator;

second switching means responsive to said first switching means for coupling said neutral connection of said alternator to said electrical load if said output of said alternator is decoupled from said electrical load by said first switching means;

a parking brake switch; and third switching means responsive to said parking brake switch for coupling and decoupling said electrical load to said neutral connection in response to positions of said parking brake switch; wherein said electrical load is a headlamp of a motor vehicle.

2. An electrical system as recited in claim 1, wherein said first switching means comprises a high-current headlamp switch.

3. A method for controlling an electrical system comprising an electrical load adapted to be coupled and decoupled from a first voltage, said method comprising:

coupling said electrical load to a neutral connection of a polyphase alternator in response to said electrical load being decoupled from said first voltage; and coupling and decoupling said electrical load from said neutral connection of said alternator in response to a position of a parking brake switch;

wherein said electrical load is a headlamp.

4. An electrical system comprising:

a polyphase alternator having a neutral connection and an output having an average voltage greater than an average voltage at said neutral connection;

at least one headlamp;

a headlamp switch connected between said output of said alternator and said headlamp and adapted to switchably couple and decouple said output of said alternator to and from said at least one headlamp;

a first relay having a contact responsive to said headlamp switch such that said contact couples said neutral connection of said alternator to said headlamp when said headlamp switch decouples said output of said alternator from said headlamp;

a parking brake switch; and a second relay having a contact responsive to a position of said parking brake switch and in series with said contact of said first relay.

* * * * *